Sept. 13, 1927.
R. G. FORDYCE
1,642,607
MACHINE FOR DEPOSITION OF COATING
Filed Nov. 12, 1926   3 Sheets-Sheet 2
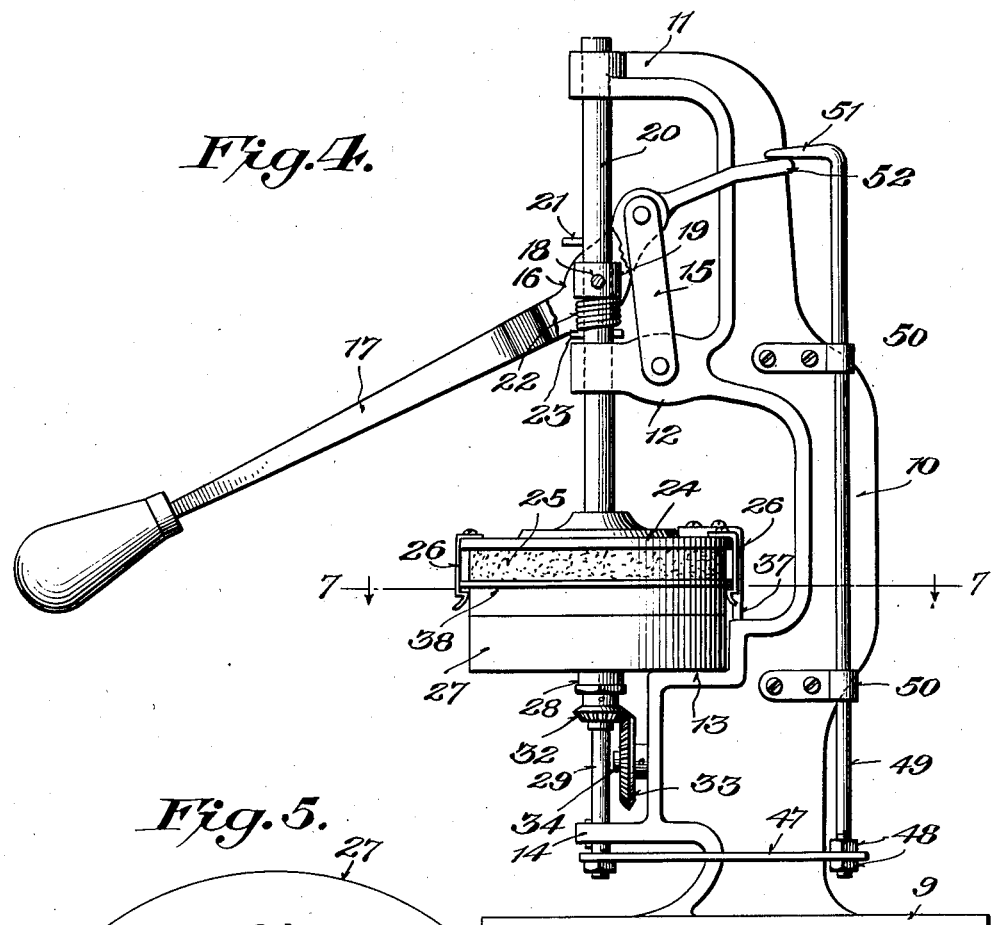
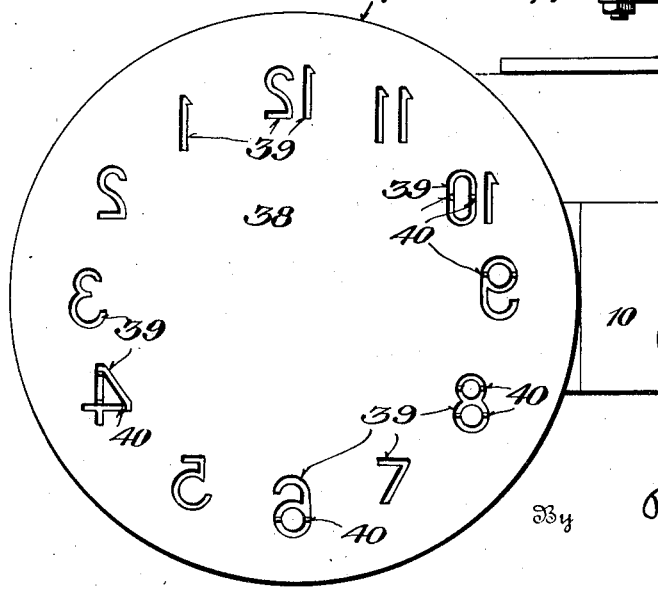

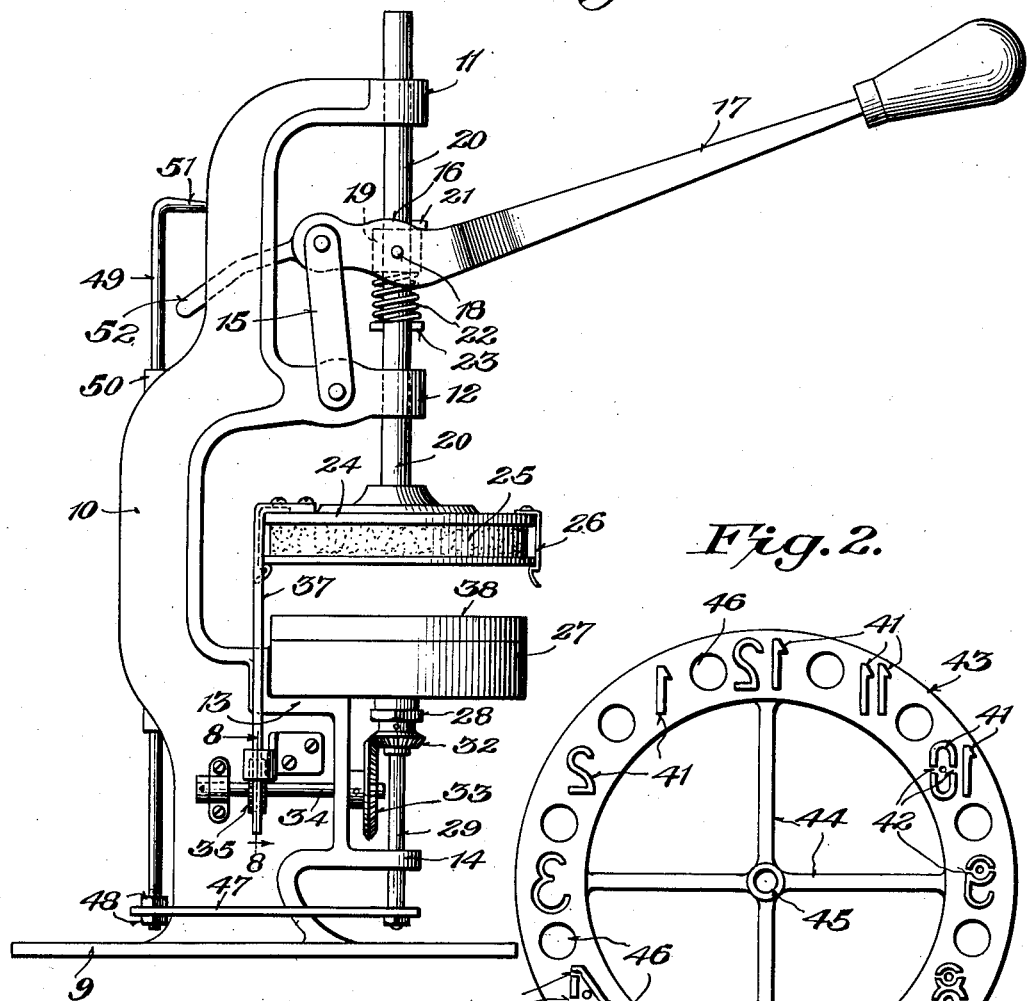
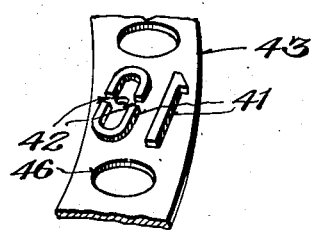

Sept. 13, 1927.

R. G. FORDYCE 1,642,607

MACHINE FOR DEPOSITION OF COATING

Filed Nov. 12, 1926    3 Sheets-Sheet 3

Inventor
Rufus G. Fordyce,
By Royal E. Burnham,
Attorney

Patented Sept. 13, 1927.

1,642,607

UNITED STATES PATENT OFFICE.

RUFUS G. FORDYCE, OF CHICAGO, ILLINOIS.

MACHINE FOR DEPOSITION OF COATING.

Application filed November 12, 1926. Serial No. 147,987.

This invention relates to machines for deposition, stamping, or embossing of liquid or semi-liquid coating material on surfaces in the form of letters, numerals, other characters, ornamental configurations, etc., under the influence of mechanical action.

It is an object of the invention to provide a machine containing instrumentalities so coordinated and coacting that they successively position pieces of stock to be treated against a stencil, deposit coating thereon, and remove them from the stencil.

Another object of the invention is to provide in such a machine a single actuating element associated with movable parts as to cause them to act in the proper sequence.

Further, it is an object of the invention to provide a stirrer operated in the coating-container as a result of movement of the actuating element of the machine.

When considered with the description herein, the characteristics of the invention are apparent from the accompanying drawings, forming part hereof, wherein there is disclosed, for purposes of illustration, an adaptation of the invention to a hand-controlled machine for deposition of luminous compound in the shape of numerals on the dial elements of timepieces.

Although the disclosures exemplify what now is considered to be a preferable embodiment of the invention, it is to be understood that it is not the intention to be limited necessarily thereto in interpretation of the claims, as modifications and adaptations, within the limits of the claims can be made without departing from the nature of the invention.

Like reference-characters refer to corresponding parts in the views of the drawings, of which—

Fig. 1 is a side elevation, the stock-presser being shown in uppermost position;

Fig. 2 is a plan view of the coating-carrier;

Fig. 3 is a fragmentary view thereof;

Fig. 4 is an elevation of the side opposite to that shown by Fig. 1, the stock-presser being shown in lowermost position;

Fig. 5 is a plan view of the stencil;

Fig. 6 is a fragmentary section thereof;

Figure 7:
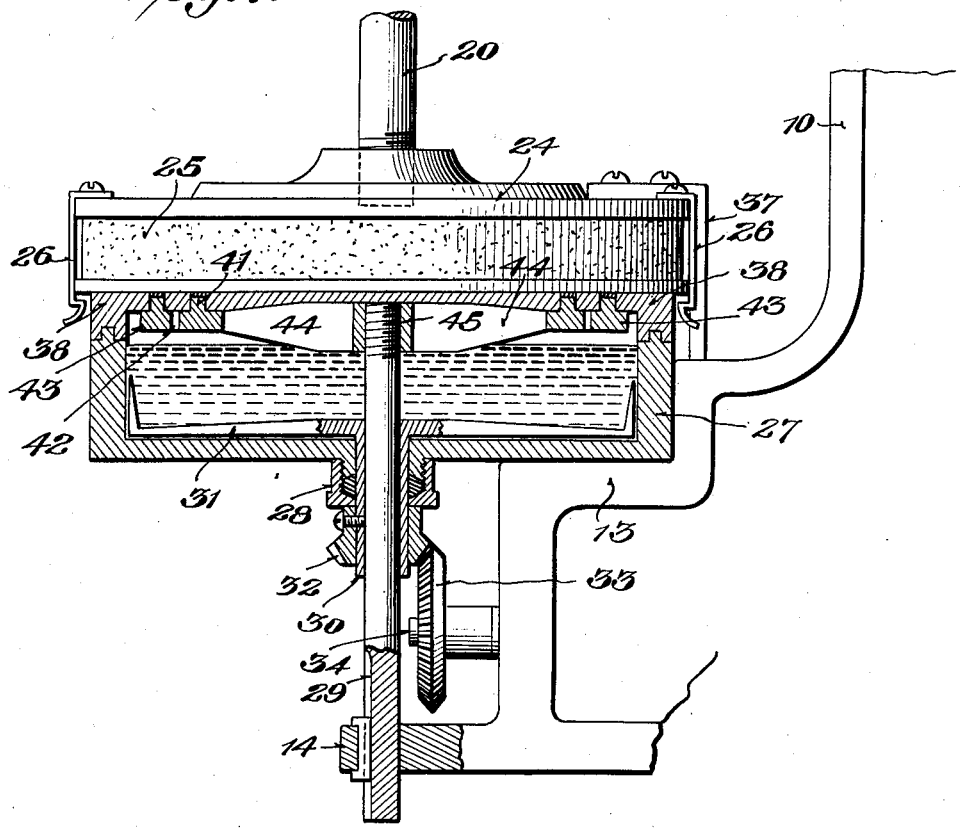
Fig. 7 is a vertical section on the line 7—7, Fig. 4, certain parts being shown in elevation.
Figure 8:
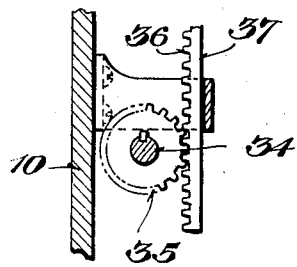
Fig. 8 is a section on the line 8—8, Fig. 1.

Machine-frame.

The frame of the machine, which rises from a plate-like base member 9, comprises an upright 10, upper members 11 and 12, a member extending laterally from the lower part of the upright and affording an abutment 13, and a member 14 extending from the lower part of the abutment member.

Stock holding and moving elements.

Links 15 mounted on the member 12 are connected to legs 16 of a bifurcated end portion of an operating-lever 17. The lever is connected by pivots 18 to a collar 19 between its legs, and the collar is slidable on a substantially vertical rod 20 reciprocable in frame members 11 and 12 between an upper abutment 21 and a coil spring 22 on the rod interposed between the collar and a lower abutment 23.

A plate 24 is mounted on the lower end of the rod 20, and a cushion 25 is fixed to the under side thereof. Stock to be treated by the machine—as, for example, pieces of sheet material to constitute timepiece-dials—is held against the under surface of the cushion in any suitable manner, as by spring-clips 26 attached to the edge of plate 24.

Coating container and stirrer.

A tank 27 for containing coating is mounted on the frame-abutment 13, and it has a stuffing-box 28 at its bottom. A slidable non-rotatable shaft 29 is disposed through the frame member 14 and the stuffing-box and extends upwardly into the tank.

A sleeve 30 is rotatable on the shaft, and it carries on its upper end stirrer members 31, which lie close to the bottom and sides of the tank. The sleeve has a pinion 32 at its lower or outer end, which is driven by a gear 33 on a drive-shaft 34 journaled on the frame. A pinion 35 on the shaft 34 is engaged by a rack 36 of a member 37 secured at its upper end to one of the stock-moving elements, as to the plate 24, whereby the stirrer is driven during movement of the lever 17.

Stencil.

A stencil-plate 38 constitutes the cover of the tank 27, and it is secured to the latter in any suitable manner in alignment with the cushion 25.

The stencil has openings 39 therethrough of the shape, disposition, and size of the configurations to be formed on the surface of the stock; for example, as shown, of the shape, disposition, and size of numerals to be formed on the dials of timepieces. In the case of certain characters—as, for example, "4", "6", "8", "9", "0"—the central parts thereof are supported by bridges 40. The bridges are at the bottom of the plate only, in order that the top of the opening, which comes into contact with the stock and forms the characters, shall be entirely open and produce continuous characters.

*Coating-depositing mechanism.*

Members 41, in the nature of raised characters, of the shape and disposition of the openings of the stencil, are mounted in the tank in alignment with those openings. The members 41 are slightly smaller than the stencil-openings, to permit their free entrance into the openings and to allow escape of excess coating. In the case of certain of the members that enter into stencil-openings having bridges, they are interrupted or grooved, as shown, for example, at 42, with respect to the "0" in Fig. 2.

The members 41 are disposed on a carrier 43 mounted on the upper end of the shaft 29. The carrier is such as to accommodate the required number of members 41. For example, it may be a ring, as shown, supported by radial arms 44 extending from a hub 45 having screw-threaded association with the shaft 29. The carrier has openings or holes 46 to permit coating to drain therethrough.

The shaft 29 rests on or is connected with an arm 47, which in turn is connected by adjustable nuts 48 with a lower portion of a vertically-slidable rod 49 guided by fittings 50 on the frame. The rod 49 has a laterally-turned upper terminal portion 51 or other suitable abutment, which is contactable by an arm 52 of the lever 17.

*Operation.*

When the plate 24 and the cushion 25 thereon are in the uppermost position, the carrier 43 and the members 41 thereon are in recessive position with respect to the stencil and immersed in coating in the tank. While the parts are in that position, a treated piece of stock may be removed and another piece positioned under the cushion, where it is held by the clips 26.

Then the lever is operated to bring the stock against the stencil. The parts so are coordinated that, by the time the stock has reached the stencil the arm 52 just has, or is about to, come into contact with the abutment 51 of the rod 49. Thereupon, with continuance of pressing movement of the lever, which is permitted by yielding of the spring 22, the arm 52 raises the rod 49 and through the instrumentality of the arm 47, shaft 29, and the carrier the members 41 are moved into the stencil-openings and coating thus is forced upwardly through the stencil and deposited upon the surface of the stock. Sufficient coating will remain on the top of the members 41 for deposition on the stock, and excess coating runs off, and also is wiped off the sides of the members by the walls of the stencil-openings.

The amount of coating deposited depends to some extent upon the amount of protrusion of the members 41 into the stencil-openings. Such protrusion may be adjusted by turning the hub 45 on the threaded end of shaft 29, or by turning the nuts 48 to raise or lower the normal position of the abutment 51 so that the arm 52 comes into contact therewith later or earlier during movement of the lever.

When the presser-plate is moved to withdraw the piece of stock from the stencil, the coating-carrier returns to its normal position.

During movement of the presser-plate toward and from the stencil, the rack 36 connected therewith and in engagement with the pinion 35 turns the stirrer by means of the drive-shaft 34, gear 33, pinion 32, and shaft 30.

What I claim as new, and desire to secure by Letters Patent, is—

1. In a stenciling-machine, a stencil having openings therethrough, a stock-presser at one side of said stencil, an actuating member for said stock-presser, a coating-carrier at the other side of said stencil having members aligned with said openings, and an actuating train for said carrier movable by said actuating member, after stock is brought against said stencil by said stock-presser, to move said carrier members into said openings.

2. In a stenciling-machine, a stencil having openings therethrough, a coating-carrier at one side of said stencil having members movable into said openings, a stock-presser at the other side of said stencil, a reciprocable member connected with said stock-presser, an actuating member for said reciprocable member, a spring positioned to be compressed against said reciprocable member by said actuating member, and an actuating train for said carrier arranged to be moved by said actuating member during compression of said spring.

3. In a stenciling-machine, a stencil having openings therethrough, a stock-presser at one side of said stencil, an operating-lever for said presser, a coating-carrier at the other side of said stencil having members aligned with said openings, a shaft connected with said carrier, and an actuating device for said shaft movable by said lever.

4. In a stenciling-machine, a coating-container, a stencil thereabove having openings, a stock-presser above said stencil, an operating-lever for said presser, a coating carrier in said container having members aligned with said openings, a shaft extending upwardly into said container connected with said carrier, and an actuating device for said shaft movable by said lever.

5. In a stenciling-machine, a stencil, a coating-container at one side thereof, a stock-presser at the other side of said stencil, a stirrer in said container, and drive mechanism for said stirrer actuated by said presser.

6. In a stenciling-machine, a stencil, a coating-container at one side thereof, a stock-presser at the other side of said stencil, a stirrer in said container, and drive mechanism for said stirrer comprising a shaft, a pinion fast thereon, and a rack in engagement with said pinion connected with said presser.

7. In a stenciling-machine, a coating-container, a stencil having openings therethrough above said container, a stock-presser above said stencil, a reciprocable shaft extending upwardly into said container, a coating-carrier in said container connected with said shaft and having members aligned with said openings, means whereby said shaft is moved, a stirrer rotatably mounted on said shaft, and drive means for said stirrer comprising a drive-shaft, a pinion on said drive-shaft, and a rack in engagement with said pinion connected with said presser.

8. In a stenciling-machine, the combination of a coating-container, a stencil having openings therethrough above said container, a stock-presser above said stencil, an actuating member for said presser, a reciprocable shaft extending upwardly into said container, a coating-carrier in said container connected with said shaft and having members aligned with said openings, a stirrer rotatably mounted on said shaft, means responsive to movement of said actuating member whereby said shaft is moved, a stirrer rotatably mounted on said shaft, and drive means for said stirrer comprising a drive-shaft, a pinion fast on said drive-shaft, and a rack in engagement with said pinion connected with said presser.

9. In a stenciling-machine, a stencil having openings therethrough, a stock-presser at one side of said stencil, an actuating member for said stock-presser, a coating-carrier movable at the other side toward and from said stencil and having thereon members conforming to the shape and disposition of said openings and capable of being protruded thereinto, and actuating means for said carrier responsive to movement of said actuating member.

In testimony whereof I affix my signature.

RUFUS G. FORDYCE.